No. 664,066. Patented Dec. 18, 1900.
J. TOBIN.
PROSPECTING PAN.
(Application filed Apr. 10, 1900.)

(No Model.)

Witnesses:
J. L. Edwards Jr.
R. H. Pittman

Inventor:
John Tobin
By his Attorney,
F. H. Richards.

THE NORRIS PETERS CO., PHOTO-LITHO., WASHINGTON, D. C.

UNITED STATES PATENT OFFICE.

JOHN TOBIN, OF NEW YORK, N. Y.

PROSPECTING-PAN.

SPECIFICATION forming part of Letters Patent No. 664,066, dated December 18, 1900.

Application filed April 10, 1900. Serial No. 12,346. (No model.)

*To all whom it may concern:*

Be it known that I, JOHN TOBIN, a citizen of the United States, residing in New York, (Brooklyn,) in the county of Kings and State of New York, have invented certain new and useful Improvements in Prospecting-Pans, of which the following is a specification.

My invention relates to prospecting-pans for washing out gold; and one object thereof is the provision of a pan of improved construction and one that will more securely retain the gold during the process of washing auriferous earth, tailings, or other debris.

A further object of the invention is the provision of a pan having a pocket that will retain the gold and prevent its escape when the pan is in an inclined position to permit water and lighter particles of the matter to be washed to be discharged over its edge.

A further object of the invention is the provision of a prospecting-pan having secured to its rim a perforated plate or sheet which extends down the side and nearly to the bottom of the pan and is attached in place by any suitable means, said plate constituting the cover or a space or pocket, which will more securely retain the gold and permit the washing to be carried out with great rapidity and with less loss.

A further object of the invention is the provision on the edge of the plate just described of a series of projections constituting a grid, which will prevent the entrance of stones or other comparatively large masses of material into the space or pocket covered by the perforated plate.

Figure 1:
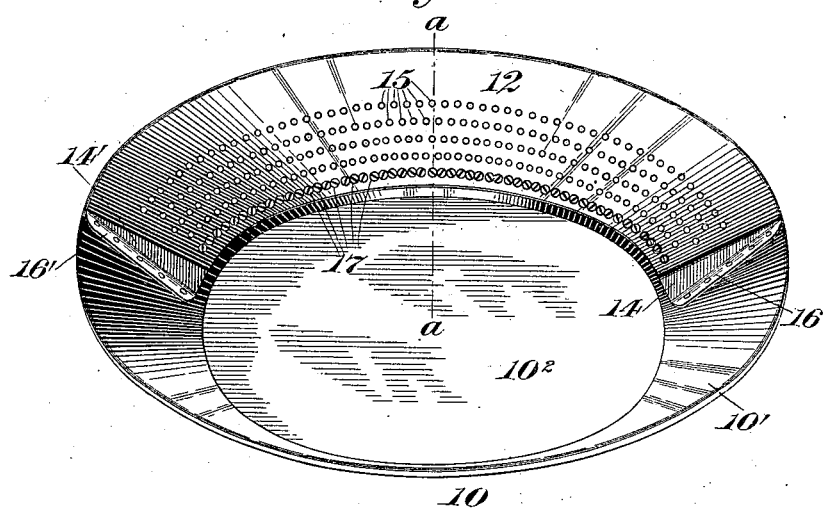
Figure 2:
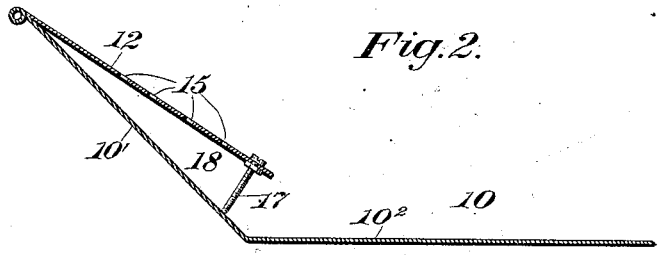

In the accompanying drawings, Figure 1 is a perspective view of a prospecting-pan, showing my invention applied thereto; and Fig. 2 is a transverse partial section of the pan on line *a a*, Fig. 1.

Referring to the drawings, the numeral 10 designates a prospecting-pan of ordinary form having flaring sides 10' and a bottom $10^2$. Attached in any desirable way, but preferably, as shown, to the edge of the pan, is a plate 12, having a series of perforations 15. This plate conforms in shape to the curvilinear outline of the side of the pan, is attached at its edge by solder or otherwise to the rim of the pan, and is provided at each end with downwardly-extending projections 14 14', having flanges 16 16', said flanges being riveted or secured in any other desired manner to the pan. Arranged in a circle concentric to the axis of the pan or in any other desired way and inserted in said plate 12 are a series of screws 17, spaced at intervals and constituting a grid for preventing the entrance of stones or other masses of material of comparatively large size into the space or pocket 18, formed between the plate 12 and the side 10' of the pan. By virtue of this construction the space between any two screws may be enlarged by taking out the intermediate screw or screws, and any desired size or space may therefore be obtained. Furthermore, as the screws are adjustable they may be forced against or withdrawn from the side of the pan, thereby regulating the area of the opening between the lower edge of the plate 12 and said side, or certain screws may be slightly withdrawn and others forced against the side of the pan, as desired. Adjustable projections are thus provided which render the pan more efficient in the work for which it is intended and adapt it for working various kinds of auriferous earths.

While screws are shown as employed for the purpose just mentioned, it is distinctly to be understood that my invention is not limited thereto, for the plate 12 may have projections of any sort depending from its inner edge and located at intervals for accomplishing the purposes described.
As is well known in what is known as "panning," the operator dips his pan, which he holds by the rim, into the water and then imparts to said pan rotary and oscillatory motions, occasionally stirring up the mass in the pan and crushing the clods of earth contained therein. Under this action stones are thrown out and the water is caused to circulate around the inside of the circumference of the pan, the heavier portions, including the gold, settling and the lighter matters discharging over the edge of the pan. In this well-known mode of operation a small proportion of the gold or other valuable metal it is desired to obtain is inevitably lost, and my invention is designed, primarily, to avoid this loss and to collect with certainty all of the valuable material.

In the operation of my invention the gold is collected in the bottom of the pan in the usual manner, and when the pan is tilted the gold falls into the space or pocket 18, where it is secured until the washing is almost complete, when the material collected in said pocket may be drawn to the plain side of the pan and the washing completed.

My invention is not limited to the precise device shown and described, for a pocket or pockets may be formed at other points in the pan without departure therefrom.

Having described my invention, I claim—

1. A prospecting-pan having a plate secured to and extending over its side to form a pocket between said plate and side, and a series of separated projections depending from the free edge of said plate and constituting a grid.

2. A prospecting-pan having a plate extending from the rim over the side to form a pocket, and a series of separated projections depending from the free edge of the plate and resting against the side of the pan.

3. A prospecting-pan having a perforated plate extending from the rim over the side of the pan to form a pocket, said plate having a series of adjustable projections depending from its free edge and resting against the side of the pan.

4. A prospecting-pan for hand use having a pocket closed at one side and open at the other side and provided with a grid, the end of said grid resting against the side of the pan.

5. The combination, with a prospecting-pan, of a curved plate secured to the rim of said pan and having its free edge extending over the side of the pan to form a pocket; and a series of removable projections carried by said plate.

6. The combination, with a prospecting-pan, of a curved plate perforated at intervals, said plate being secured at its upper edge to the rim of the pan and being provided with a grid at its lower edge.

7. The combination, with a prospecting-pan, of a curved perforated plate secured at its ends to said pan, and a series of projections carried by the free edge of the plate, said projections resting against the side of the pan and constituting a grid.

8. The combination, with a prospecting-pan, of a plate curved throughout its length to conform to the shape of the side of the pan, said plate having at each end flanges by which it is secured to the pan, and a series of screws carried by said plate at its free edge.

9. The combination, with a prospecting-pan, of a curved plate perforated longitudinally throughout a portion of its width; means for securing said plate to the side of the pan; and a series of screws carried in the free edge of the plate, said screws resting against said pan and serving the purpose of a grid.

JOHN TOBIN.

Witnesses:
FRED. J. DOLE,
C. E. VOSS.